United States Patent
Hara et al.

(10) Patent No.: US 6,718,353 B2
(45) Date of Patent: Apr. 6, 2004

(54) METHOD AND SYSTEM FOR ORDERING IMAGE PROCESSING WHILE REDUCING AMOUNT OF IMAGE DATA TRANSFERRED

(75) Inventors: Shoji Hara; Nobuyoshi Nakajima, both of Kanagawa-ken (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/156,764

(22) Filed: Sep. 18, 1998

(65) Prior Publication Data

US 2002/0038323 A1 Mar. 28, 2002

(30) Foreign Application Priority Data

Sep. 19, 1997 (JP) .............................................. 9-255034

(51) Int. Cl.[7] .............................................. G06T 15/00
(52) U.S. Cl. ....................................... 707/502; 707/528
(58) Field of Search ................................. 707/526, 528, 707/502; 345/408, 409

(56) References Cited

U.S. PATENT DOCUMENTS 5,712,964 A * 1/1998 Kamada et al. ............. 345/418
5,760,916 A * 6/1998 Dellert et al. ............... 358/408
5,949,551 A * 9/1999 Miller et al. ................ 358/408
6,069,712 A * 5/2000 Dellert et al. ............... 358/408
6,091,518 A * 7/2000 Anabuki ..................... 358/500

* cited by examiner

Primary Examiner—Stephen S. Hong
(74) Attorney, Agent, or Firm—Birch, Stewart, Kolasch & Birch LLP

(57) ABSTRACT

In an image processing order system using a network, the amount of programs or data to be transferred can be reduced when a program for image processing (including data to be used) is transferred from a server computer of a service provider to a personal computer of a user. Each image is stored as low resolution image data for use on a personal computer of a user, and high resolution image data that is used for generating a processed print by a service provider. Furthermore, plural kinds of at least a portion of parts of a program for the processing are stored in a hard disc of the server computer, depending on resolution. When a mask processing program is transferred to a user, only the procedure for the mask processing and low resolution mask data are transferred, and high resolution mask data are not. In this manner, the amount of data to be transferred can be reduced.

9 Claims, 3 Drawing Sheets

METHOD AND SYSTEM FOR ORDERING IMAGE PROCESSING WHILE REDUCING AMOUNT OF IMAGE DATA TRANSFERRED

BACKGROUND OF THE INVENTION

1. Field of the Invention

The present invention relates to a method and a system for ordering image processing in a digital photographic service using the Internet for example, whereby a print output of an image on which processing such as composition has been carried out is ordered via the network.

2. Description of the Related Art

Digital photographic services using the Internet have become recently available. According to these services, if digitization and storage of images are ordered at the time a film is deposited for development, for example, the photographs recorded on the film are disclosed via the Internet only to the orderer. Therefore, the orderer can order additional printing, etc. without going to a service provider, simply by referring to the disclosed photographs on a personal computer connected to the network.

As an image file appropriate for such a digital photographic service, FlashPix files have been proposed by Eastman Kodak Co. FlashPix files are based on a structured storage technique proposed by Microsoft Corp., and the files themselves have hierarchy structures similar to conventional directory structures. More specifically, image data is classified by resolution, wherein the same image can be represented at various resolutions, or various kinds of property information of the image data may be recorded as components of the hierarchy.

By storing images as FlashPix files in a server, a service provider provides low resolution image data which has a higher transfer or display speed when the user requests reference to the images stored in the server, for example. Furthermore, when the user requests a print output of the same images, the service provider uses image data at a higher resolution. In this manner, appropriate data are used depending on the purpose. Moreover, since one image corresponds to one file, a complicated management of the images is not required.

Meanwhile, for the above described digital photographic service, in the case where printing of processed images such as printing of a composed photograph, is ordered, a method has been proposed wherein a user carries out the image processing (such as image composition on a personal computer) and provides a laboratory with information showing a procedure of the image processing, instead of processed image data, via a recording medium such as a floppy disc, or via a network. In this case, a system in the laboratory can carry out the same processing as the user has carried out on the personal computer, based on the information provided by the user. By carrying out this processing on stored high resolution image data, a processed photographic print can be generated.

When a laboratory (service provider) and a user carry out the same procedure in this manner, a program for the processing is usually written that emphasizes the quality of images printed in a laboratory, and the program is installed in the system as a single program, being provided to users as well.

Since this program is sometimes provided to a user via a network, it is preferable for the program size to be small.

However, in order to reduce the size of the program, it is necessary to simplify the processing the program carries out, or to lower the precision of the processing. However, by doing this, image quality of prints may not be maintained.

SUMMARY OF THE INVENTION

Based on consideration of the above problems, an object of the present invention is to provide a method for ordering image processing, wherein the quality of a print is maintained and the amount of transferred programs or data is reduced when transferring the image processing program (including the data to be used for the processing) from a server computer of a service provider to a personal computer of a user, in the case where the image processing is ordered via a network.

DESCRIPTION OF THE PREFERRED EMBODIMENT

Figure 1:
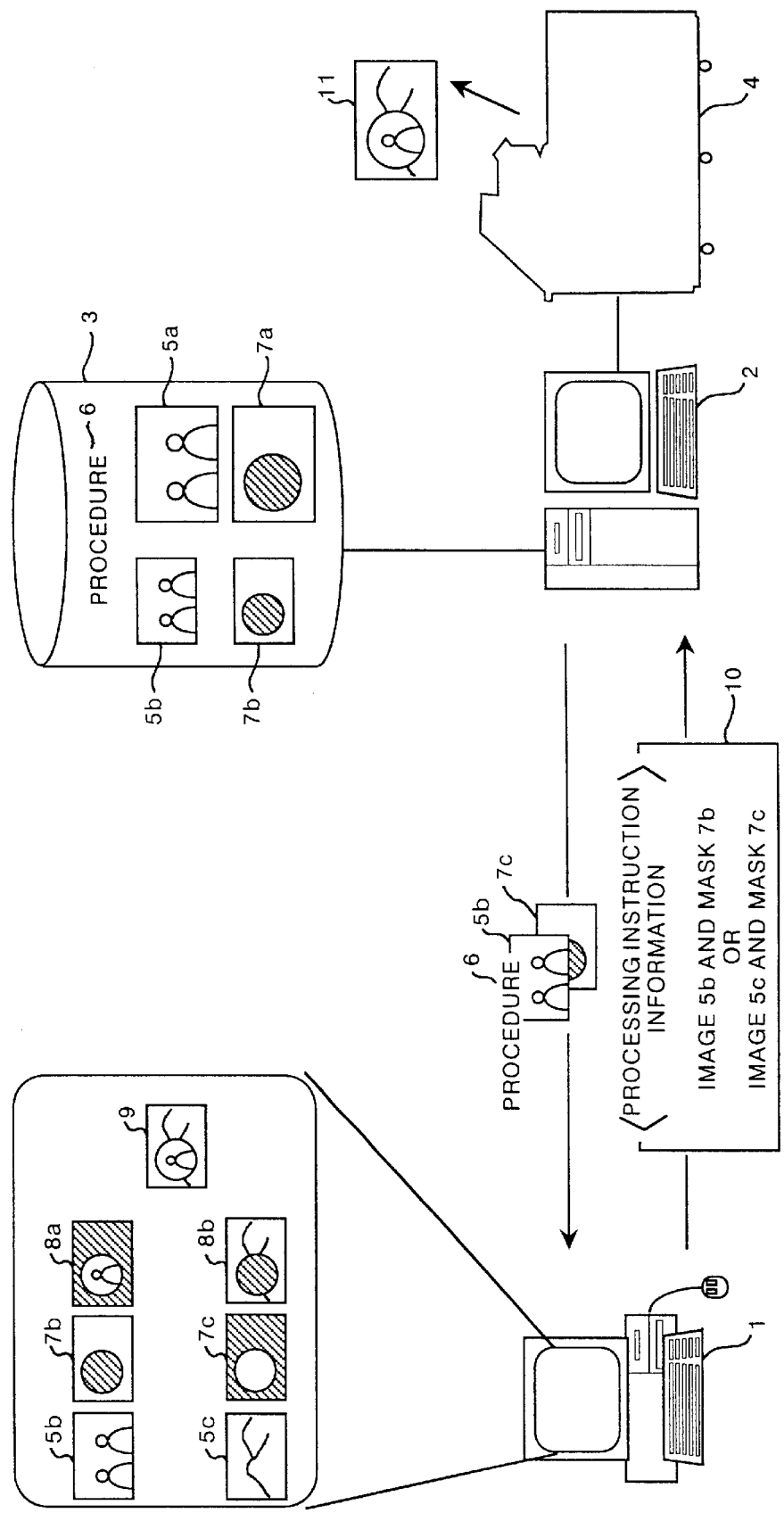
FIG. 1 is a diagram showing an outline of an image processing order system of the present invention.

Unless otherwise indicated, and to facilitate understanding of the invention, the phrase "a server computer which carries out storage, processing, and reproduction of the image" means not only a single apparatus, but also a system comprising a plurality of apparatuses, such as an apparatus for image storage and management, an apparatus for image processing, and a photographic printer, for example. A "client computer" means a personal computer of a user for photographic services, for example.

Additionally, the terms "high resolution image data" and "low resolution image data" mean image data sets classified by resolution and included in a FlashPix file, for example. However, the image data in this invention include not only the image data stored as a FlashPix file, but also image data stored as high resolution image data and low resolution image data in separated files.

In this specification, the term "a program part" is used in order to explain this invention. Hereinafter, the definition of this term will be explained.

A structure of a program generally varies depending on programming languages or design policies. Even when two programs have exactly the same components (procedure, definition, data or the like), the two programs do not necessarily have the same structure.

For example, as a program structure which uses certain data and carries out a certain procedure, two structures, that is, one structure wherein the data are included in the procedure, and the other structure wherein the procedure does not include the data, are possible. The former needs to be reprogrammed as a whole when the same procedure needs to be carried out by using data different from the one included therein. On the other hand, in the latter program, only the data needs to be changed while the procedure stays as it is.

In this specification, a unit which is easily exchanged without affecting other components of a program is called a program part. In other words, in the above example, when the procedure includes the data, one program part means a combination of the data and the procedure. When the procedure does not include the data, both the procedure and the data is called a program part.

Therefore, the "program part" means a smallest unit of division when a service provider provides a program to a user. In other words, when the procedure includes data, the data alone are not provided to a user, since the procedure is updated when the data are exchanged. Therefore, it is necessary to provide data along with the procedure. On the other hand, when the procedure does not include data, the data alone are provided to a user when the data are changed.

In many cases, a program is provided as a file. In the present invention, since transfer on a network is assumed, it includes transfer of a JAVA applet upon reference to a web page, for example. In other words, a program part does not necessarily have a one-to-one correspondence to a file. On the contrary, one program may be composed of one program part.

The definition of a program part has been explained in the above. The image processing order method of the present invention is characterized by the fact that a program part for high precision processing, and a program part for making the transfer speed faster are stored in a server computer and they are used depending on a purpose. In this method, since a program part having a relatively small size for prioritizing the transfer speed is transferred to a user, the amount of transferred program or data is reduced. However, this does not necessarily mean that all programs have two kinds of program parts, and for a program part which does not affect the program size, only one part may exist.

More specifically, when the processing uses a mask, a method is possible wherein high resolution mask data for processing high resolution image data, low resolution mask data for processing low resolution image data, and a procedure for carrying out the processing using the provided mask data are stored as program parts in a server computer.

Alternatively, in the processing using the mask, another method is possible wherein a procedure for carrying out the processing using high resolution mask data included in the procedure and a procedure for carrying out the processing using low resolution mask data included in the procedure are stored as program parts in a server computer.

As understood in this disclosure, the phrase "program part excluding the program part for the high resolution image data among the program parts to be used for the processing" means the low resolution mask data and the procedure therefor in the former mask processing while it means the procedure for the low resolution mask data in the latter mask processing.

The image processing order method, system and server computer of the present invention provides at least two kinds of image processing programs used by both a laboratory (service provider) and a user, wherein one of them prioritizes the image quality while the other prioritizes the speed of transfer, and records both programs in a server computer. The program may have a divisible structure so that a portion which does not greatly affect the program size may have one kind of part, and a portion which affects the program size greatly may have two kinds of parts. In this manner, when the program is provided to a user via a network, only the program part prioritizing faster transfer speed (having a a smaller size) is transferred, and the amount of transferred program or data is thus reduced.

In mask processing where a portion of an image is cut, mask data having a comparatively large size needs to be provided to a user. Accordingly, in this disclosure low resolution mask data for mask processing that are used by a user referring to low resolution image data on a monitor of a personal computer, and high resolution mask data used for printing by a laboratory are provided. Thus, the low resolution mask data and a procedure therefor, or a procedure including the low resolution mask data are transferred to the user. Further, the amount of transferred program or data does not increase unnecessarily as a result of transferring unnecessary high resolution mask data to a user.

The present invention is not limited to mask processing only. When the size of a program part to be transferred is comparatively large, as in the case of the mask processing, a significant effect is obtained.

Hereinafter, an embodiment of the present invention will be explained referring to the accompanying drawings. FIG. 1 is a diagram showing an outline of an image processing order system of the present invention. In FIG. 1, a personal computer 1 is a user's personal computer installed at the user's home or the like and is equivalent to a client computer. A server 2 is a computer managed by a provider of a digital image service, and comprises peripheral equipment such as a large capacity hard disc 3 for storing users' images, and a photographic printer 4 for generating photographic prints. In this specification, the server 2, the hard disc 3, the photographic printer 4 and other kinds of peripheral equipment directly connected to the server 2 are collectively called a server computer.

The personal computer 1 and the server 2 comprise communication equipment (including software) for connecting to the Internet, and they can exchange information between them. In this invention, a network means not only the Internet but also a local network.

The method and the system of the present invention assume that the hard disc 3 of the server computer stores a user's images in advance. The images are recorded when the user requests a laboratory to develop a film, for example.

In this embodiment, a digital image read from the film is stored in the hard disc 3 as a FlashPix file. The FlashPix file generally includes six kinds of image data classified by resolution. The highest and the second-highest resolution data are used for print generation, and the other four kinds of data are for display on a monitor. For easy understanding of the present invention, the following explanation assumes two kinds of image data, that is, high resolution image data for print generation and low resolution image data for display on a monitor. Practically, optimal data are selected among the plural kinds of data depending on the print size, or the size of a displayed image on the monitor.

Hereinafter, an example will be explained wherein portions of two images are cut by using a mask to generate a composite photograph, and a print of the composite photograph is ordered.

The user requests transfer of images to be processed, mask data necessary for the processing, and a program for the mask processing by accessing the server 2 from the personal computer 1. In a conventional method, images and mask data for actually generating a processed print have been provided.

The mask data are usually recorded as a 2-dimensional binary data or a set of vectors. However, if low resolution image data are processed on a monitor of a personal computer, high resolution mask data are not necessary. Therefore, in the present invention, plural kinds of not only image data, but also of mask data classified by resolution are provided in the hard disc 3. In this manner, a low resolution image data 5b and a low resolution mask data 7b having comparatively small amounts of data are transferred to the user. At the same time, a procedure 6 for mask processing is also transferred.

The user carries out the mask processing and the composition processing, referring to the low resolution image data 5b and the mask data 7b having been transferred on the screen of the personal computer 1. For example, as shown in FIG. 1, the mask processing is carried out on the image data 5b by using the mask 7b to generate a main processed image 8a, and mask processing is carried out on image data 5c using a mask 7c which is an inversion of the mask 7b to generate a processed image 8b which is a background image. By composing both processed images 8a and 8b (the main image and the background image) on the screen, a composite image 9 is generated.

The procedure of the operation the user has carried out on the screen is recorded as processing instruction information 10. The processing instruction information 10 means a character string as shown in FIG. 1, for example. By transferring the processing instruction information instead of transferring the processed image data, the amount of transferred data can be reduced.

The server 2 which receives the processing instruction information from the personal computer 1 searches the hard disc 3 based on this information, and obtains high resolution data corresponding to the image data 5b, 5c and the masks 7b and 7c. The mask processing and the composition processing is carried out by the server 2 according to the instructed procedure. In this manner, the generated composite image is output as a composite photographic print 11 by the photographic printer 4.

The data to be transferred from the server 2 to the personal computer 1 will be explained in detail, referring to FIGS. 2 and 3. When a program and data are transferred, a unit in which a transfer is possible depends on a structure of the program or that of the data.

Figure 2:
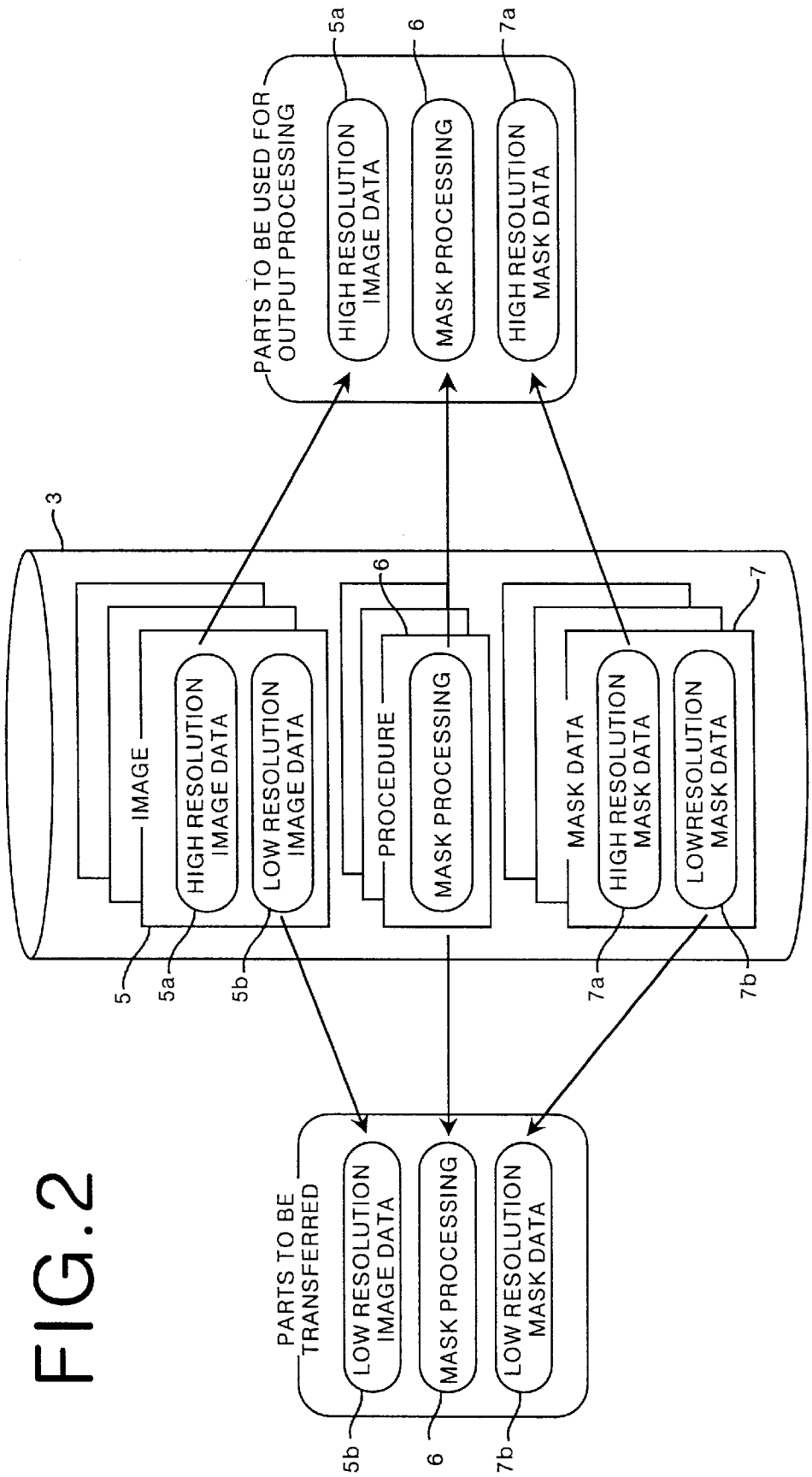
FIG. 2 is a diagram showing an example of a data structure to be recorded in a server computer.

In the example shown in FIG. 2, mask data 7a and 7b, as well as image data 5a and 5b have been stored in the FlashPix format. Separated from an image file 5 and a mask data file 7, a procedure 6 for the mask processing and the composition processing has also been stored therein.

In this example, software corresponding to the FlashPix format can refer to each kind of data in the image file 5 and the mask data file 7. Therefore, as shown in FIG. 2, the low resolution image data 5b in the image file 5, the low resolution mask data 7b in the mask data file 7, and the procedure 6 therefor are transferred to the personal computer 1. In print output processing, the high resolution image data 5a in the image file 5, the high resolution mask data 7a in the mask data file 7, and the procedure 6 (which is the same procedure that is transferred to the personal computer 1 in the above case) are used.

Figure 3:
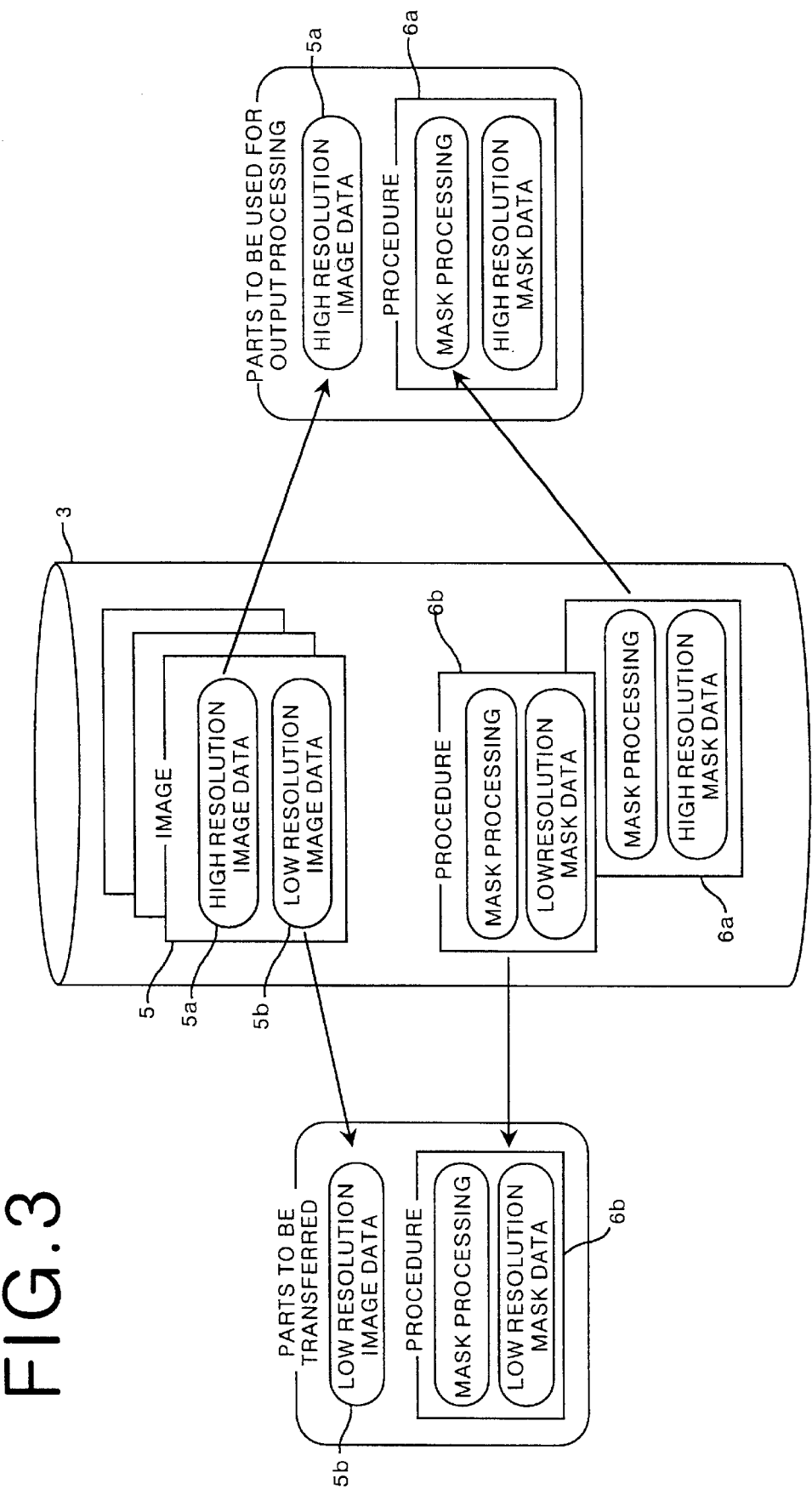
FIG. 3 is a diagram showing another example of the data structure to be recorded in the server computer.

On the other hand, in the example in FIG. 3, the procedure 6 for the mask processing includes the mask data. In this case, since the mask data are interpreted as a portion of the procedure when the procedure is compiled, the mask data and the procedure are not dealt with separately. Therefore, as shown in FIG. 3, transfer is carried out regarding a procedure as a unit of the transfer, and the procedure is used for printing as well.

As has been described above, in the present invention, plural kinds of images and program parts such as the procedure and the mask data for the mask processing are provided depending on the resolution of the image to be processed by using the program parts. Therefore, only the minimum necessary program parts are transferred to a user. In this manner, a high-speed and comfortable digital photographic service on a network can be provided.

What is claimed is:

1. A method of ordering an image processing, where processing of an image is ordered by transferring processing instructions from a client computer connected to a server computer via a network to the server computer which carries out storage, processing, and reproduction of the image, comprising:

storing the image in the server computer as high resolution image data used for reproduction of the image, and low resolution image data of a smaller data size than that of the high resolution image data;

recording, in the server computer, at least a portion of program parts to be used for the processing of the image as a pair of program parts, one program part for the high resolution image data, and another program part for the low resolution image data, wherein the program part for the low resolution image data has a smaller program size than that for the high resolution image data program part;

transferring, from the server computer to the client computer, the low resolution image data program part while excluding the high resolution image data program part from being processed;

generating processing instruction information in the client computer, said processing instruction information including instructions to search for and obtain the high resolution image data program part, and instructions to carry out mask and composition processing on the obtained high resolution data based on image mask data associated with the low resolution image data program part; and transferring only the processing instruction information from the client computer to the server computer once processing of the low resolution image data is complete.

2. A method of ordering an image processing as claimed in claim 1, wherein the processing uses a mask and wherein high resolution mask data for processing high resolution image data, low resolution mask data for processing low resolution image data, and a procedure for carrying out the processing using the provided mask data are stored as program parts in the server computer.

3. A method of ordering an image processing as claimed in claim 1, wherein the processing uses a mask and wherein procedures for carrying out the processing using high resolution mask data and using low resolution mask data are stored as separate program parts in the server computer.

4. A system for ordering an image processing, where image processing is ordered by transferring processing instructions from a client computer connected to a server computer via a network to the server computer which carries out storage, processing and reproduction of the image, wherein the server computer comprises:

image storing means which stores the image as high resolution image data used for reproduction of the image and low resolution image data of a smaller data size than that of the high resolution image data;

program part recording means which records at least a portion of program parts to be used for the processing of the image as a pair of program parts, one program part for the high resolution image data, and another program part for the low resolution image data, wherein the program part for the low resolution image data has a smaller program size than that of the high resolution image data program part;

program part transferring means which transfers, from the server computer to the client computer, the low resolution image data program part while excluding the high resolution image data program part from being processed;

image processing means which processes the high resolution image data based on processing instruction information transferred from the client computer; and image reproducing means which reproduces the high resolution image data as a visible image; and wherein the client computer comprises:

processing instruction information generating means which generates the processing instruction information said processing instruction information including instructions to search for and obtain the high resolution image data program part, and instructions to carry out mask and composition processing on the obtained high resolution data based on image mask data associated with the low resolution image data program part; and order means which orders the processing by transferring only the processing instruction information from the client computer to the server computer.

5. A system for ordering an image processing as claimed in claim 4, wherein the processing uses a mask and wherein the program part recording means records high resolution mask data for processing high resolution image data, low resolution mask data for processing low resolution image data, and a procedure for carrying out the processing using the provided mask data as the program parts.

6. A system for ordering an image processing as claimed in claim 4, wherein the processing uses a mask and wherein the program part recording means records procedures for carrying out the processing using high resolution mask data using low resolution mask data as the program parts.

7. A server computer of an image processing order system that stores an image, and carries out processing and reproduction of the image based on an instruction from a client computer, comprising:

image storing means which stores the image as high resolution image data to be used for reproduction of the image and low resolution image data of a smaller data size than that of the high resolution image data;

program part recording means which records at least a portion of program parts to be used for the processing of the image, one a program part for the high resolution image data and another program part for the low resolution image data having a program size smaller than that of the program part for the high resolution image data;

program part transferring means which transfers, from the server computer to the client computer, only the low resolution image data and its corresponding program part;

image processing means which processes the high resolution image data based only on processing instruction information transferred from the client computer, said processing instruction information including instructions to search for and obtain the high resolution image data program part, and instructions to carry out mask and composition processing on the obtained high resolution data based on image mask data associated with the low resolution image data program part; and image reproducing means which reproduces the high resolution image data as a visible image.

8. A server computer as claimed in claim 7, wherein the processing uses a mask and wherein the program part recording means records high resolution mask data for processing the high resolution image data, low resolution mask data for processing the low resolution image data, and a procedure for carrying out the processing using the provided mask data as the program parts.

9. A server computer as claimed in claim 7, wherein the processing uses a mask and wherein the program part recording means records separate procedures for carrying out the processing using the high resolution mask data included therein, and for carrying out the processing using the low resolution mask data included therein as the program parts.

\* \* \* \* \*